US009705966B1

(12) United States Patent
Cherukuri et al.

(10) Patent No.: US 9,705,966 B1
(45) Date of Patent: Jul. 11, 2017

(54) STORY DEVELOPMENT AND SHARING ARCHITECTURE

(71) Applicant: Amazon Technologies, Inc., Reno, NV (US)

(72) Inventors: Ram Cherukuri, Bellevue, WA (US); Daniel Lee Phelps, San Luis Obispo, CA (US); Ram Gole, Bellevue, WA (US); Anthony James Wilson, Atascadero, CA (US); Karl Clifford Bell, San Luis Obispo, CA (US); Daniel James Hermanson, Seattle, WA (US); Atif Choudhry Rafiq, Bellevue, WA (US); Chad Howard Young, Seattle, WA (US); John Alexander DiSanti, San Luis Obispo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 319 days.

(21) Appl. No.: 14/041,836

(22) Filed: Sep. 30, 2013

(51) Int. Cl.
*G06F 15/16* (2006.01)
*H04L 29/08* (2006.01)

(52) U.S. Cl.
CPC .................... *H04L 67/10* (2013.01)

(58) Field of Classification Search
CPC ...................................... H04L 67/10
See application file for complete search history.

(56) References Cited

U.S. PATENT DOCUMENTS

| 7,694,222 | B2 | 4/2010 | Steen et al. |
| 2002/0112004 | A1* | 8/2002 | Reid .................. H04L 12/1822 709/205 |
| 2003/0214528 | A1 | 11/2003 | Pierce et al. |
| 2005/0069847 | A1 | 3/2005 | Carter |
| 2005/0120294 | A1 | 6/2005 | Stefanison et al. |
| 2006/0149616 | A1 | 7/2006 | Hildick-Smith |

(Continued)

OTHER PUBLICATIONS

Office action for U.S. Appl. No. 14/042,124, mailed on Jan. 26, 2017, Cherukuri et al., "Story Development and Sharing Architecture: Contribution Recognition", 26 pages.

(Continued)

*Primary Examiner* — Moustafa M Meky
*Assistant Examiner* — Sm Z Islam
(74) *Attorney, Agent, or Firm* — Lee & Hayes, PLLC

(57) ABSTRACT

A community of authors, readers and contributors interact with each other through a communication framework. The authors share creative works, such as fictional stories, for consumption by the readers and for commenting by the contributors. The readers may see successive drafts of the work as an author completes and revises the work. The contributors may provide comments or other contributions to assist the author. For example, the contributors may make suggestions about how to change the work or provide supplemental content, such as cover artwork, to the author. The author may recognize publicly contributors who provide helpful comments. The likelihood of an author completing a final draft of a work may be determined based on the author's activities regarding the work. The likelihood of a completed work being popular with readers may also be determined based on user interaction with a draft of the work.

15 Claims, 10 Drawing Sheets

(56) References Cited

U.S. PATENT DOCUMENTS

| | | | |
|---|---|---|---|
| 2006/0242554 A1* | 10/2006 | Gerace | G06F 17/30867 715/209 |
| 2008/0004942 A1 | 1/2008 | Calabria | |
| 2008/0077568 A1 | 3/2008 | Ott | |
| 2008/0162510 A1* | 7/2008 | Baio | G06Q 30/02 |
| 2008/0256066 A1 | 10/2008 | Zuckerman et al. | |
| 2009/0070426 A1 | 3/2009 | McCauley et al. | |
| 2009/0263777 A1* | 10/2009 | Kohn | G09B 7/00 434/350 |
| 2010/0174579 A1 | 7/2010 | Hughes | |
| 2010/0312702 A1 | 12/2010 | Bullock | |
| 2011/0004477 A1* | 1/2011 | Bansal | H04N 5/781 704/275 |
| 2011/0225203 A1 | 9/2011 | Hart-Davidson et al. | |
| 2012/0013114 A1 | 1/2012 | Glosh et al. | |
| 2012/0150997 A1 | 6/2012 | McClements, IV | |
| 2012/0265570 A1 | 10/2012 | Hegazi | |
| 2012/0284310 A1 | 11/2012 | Yager | |
| 2012/0324393 A1 | 12/2012 | Mbenkum et al. | |
| 2013/0030896 A1 | 1/2013 | Mai-Tal et al. | |
| 2013/0086484 A1 | 4/2013 | Antin et al. | |
| 2013/0218733 A1* | 8/2013 | Rago | H04L 63/08 705/30 |
| 2013/0218961 A1* | 8/2013 | Ho | G06Q 30/02 709/204 |
| 2014/0181001 A1 | 6/2014 | Cudak et al. | |
| 2014/0281895 A1* | 9/2014 | Tay | G06F 17/212 715/234 |
| 2014/0297743 A1 | 10/2014 | Zyto et al. | |
| 2015/0052427 A1 | 2/2015 | Vagell et al. | |
| 2015/0178279 A1 | 6/2015 | Chen | |

OTHER PUBLICATIONS

Silvermann, Reddit: A Beginner's Guide, retrieved on Jan. 10, 2017 at http://mashable.com/2012/06/06/reddit-for-beginners/#A1CJ2kE5hEqx, Mashable, Published Date Jun. 6, 2012, 9 pages.

U.S. Appl. No. 14/042,019, filed Sep. 30, 2013, Cherukuri et al., "Story Development and Sharing Architecture: Predictive Data".

Office action for U.S. Appl. No. 14/042,019, mailed on Jun. 17, 2016, Cherukuri et al., "Story Development and Sharing Architecture: Predictive Data", 21 pages.

Office action for U.S. Appl. No. 14/042,124, mailed on Jul. 28, 2016, Cherukuri et al., "Story Development and Sharing Architecture: Contribution Recognition", 24 pages.

Office action for U.S. Appl. No. 14/042,124, mailed on Aug. 27, 2015, Cherukuri et al., "Story Development and Sharing Architecture: Contribution Recognition", 16 pages.

Office action for U.S. Appl. No. 14/042,019, mailed on Dec. 17, 2015, Cherukuri et al., "Story Development and Sharing Architecture: Predictive Data", 14 pages.

Office action for U.S. Appl. No. 14/042,124, mailed on Feb. 1, 2016, Cherukuri et al., "Story Development and Sharing Architecture: Contribution Recognition", 25 pages.

\* cited by examiner

STORY DEVELOPMENT AND SHARING ARCHITECTURE

BACKGROUND

Authors can face a long, lonely process of writing. Authors may seek assistance from friends, family and colleagues. However, authors that are not associated with the professional publishing industry may have difficulty finding reliable sources for support and constructive feedback. Good ideas may go unpublished and good books unwritten not because an author lacks the quality of ideas, but rather because the author may face hurdles in the process of writing that he or she cannot overcome alone.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
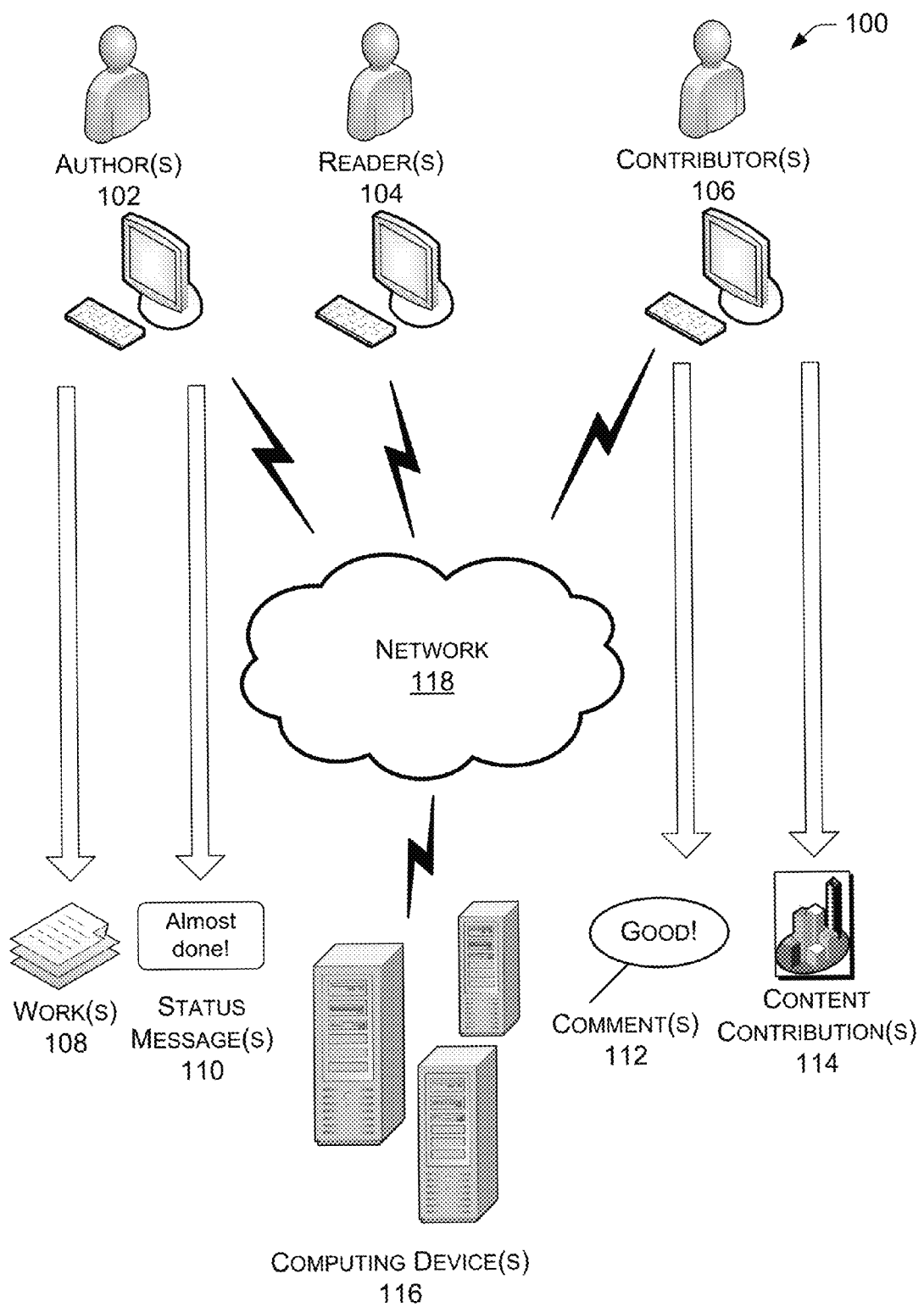
FIG. 1 is an example architecture for a networked community of authors, readers and contributors.

This disclosure describes a community in which authors can find support and help during the writing process, readers can access new works and see the progress of a work as it is written and contributors may provide feedback to authors in a way that can have a substantive effect on the development of a work. As used herein, "work" includes any work of authorship such as, but not limited to, a novel, a short story, a poem, a news article, a biography, an instruction manual, a recipe, software code, sheet music or the like. Works of authorship include "written works" that are works created by using characters written, typed etc. in a language that is used for human conversation (e.g., excluding video and audio creations as well as computer code and musical notation).

Users in this community may fill one, or more, of the three roles mentioned above: author, reader and contributor. Authors create works. Authors may write a full draft of a work before sharing it with the community or share the work as it is being written, for example, chapter by chapter. Readers participate in the community primarily by reading works. The readers interact with most works by simply reading the text of the work. However, "read" and "reading" also includes activities such as playing an instrument according to instructions provided on sheet music or compiling software code. The contributors are generally a subset of readers who interact with the authors, and each other, by making contributions to the community in the form of comments, feedback or by contributing content support of a work. Users are not limited to particular roles. An author may also take the role of reader by passively consuming another's work and also take the role of a contributor by providing editorial suggestions to another author. The community framework and ability for users to easily shift roles may encourage greater creative activity by turning readers into contributors and contributors into authors.

Features of this community, which are described in greater detail below, include sharing works submitted by authors with other users, receiving feedback or content contributions, notifying members of the community about activity of others and receiving rapid feedback on pitches for proposed works. In order to encourage contributors to expend the effort necessary to make contributions, the writers may provide recognition to those contributors who make particularly valuable contributions. Some implementations may even show which comments an author is actively considering while writing or revising a work. Recognition that the contributors receive from the authors may be quantized and shown to others in the community so that contributors with particular skill sets or a history of providing high-quality contributions may be readily identified.

Readers are supported by receiving indications of how likely an author is to complete a draft work. Many writing projects are abandoned, but in this community interaction of an author with his or her work is tracked as well as that author's history of completing other works. For a given work, a likelihood that it will in fact be completed may be shown to readers so they are able to better select which works they wish to spend time reading. Authors are also provided meaningful and data-driven encouragement through showing authors a success metric for their works which indicates the likelihood that a given work will be popular with a group of readers. This success metric may be derived from actions of the readers and contributors in the community. By exposing this metric to the author, this community can help an author identify works that have the potential for commercial success.

Illustrative Architecture

FIG. 1 is a schematic diagram of an illustrative architecture 100 for connecting multiple users including, but not limited to, authors 102, readers 104 and contributors 106. The multiple users may access the architecture 100 through web-based user interfaces accessible from any device capable of displaying a webpage (e.g., desktop computers, smart phones, tablet computers, notebook computers, personal digital assistants, electronic book readers and the like). In other implementations, the users may access the architecture 100 through interfaces other than webpages, such as, specialized applications, telephones (e.g., audio interface) and the like.

Architecture 100 supports a community that interacts with authors 102 who have chosen to share works 108 that they have created or are in a process of creating. The authors 102 may post, upload or otherwise share their works with the other members of the community such as the readers 104 and the contributors 106. The authors 102 may also post, upload or otherwise share status messages 110 informing readers 104 and contributors 106 about the status of a work or requesting assistance with a work. In some implementations, only those readers 104 and contributors 106 that previously choose to receive status messages 110 from the author 102 will receive the status messages 110.

The readers 104 role in the community may be to passively consume the works 108. Although the readers 104 may not explicitly provide any type of feedback, the architecture 100 may, after receiving appropriate permissions from the individual readers 104, track reader activity including which works 108 are being read, how long the readers 104 spend with the given work 108 and other aspects of reader interaction with the works 108. The contributors 106 may go beyond merely reading the works 108 and provide comments 112 about the works 108. Any reader 104 may become a contributor 106 simply by choosing to take a more active role in the community and submitting a comment 112. The comments 112 may be any type of input that a contributor 106 chooses to make with respect to a work 108. For example, the comment may be a passage of text that the contributor 106 generates to critique, criticize, support, suggest, encourage or otherwise communicate with the author 102 of the work 108. Contributors 106 may also provide content contributions 114 such as an image (e.g., proposed cover art for a novel), music, a recording of a reading of the work 108, documents located or produced by the contributor 106 to assist the author 102 with the work 108 or the like. The comments 112 and content contributions 114 may be provided by the contributors 106 to the community by uploading a file or other electronic document. Some comments 112 may be directed primarily towards readers 104 and other contributors 106 rather than author 102. One example of this type of comment is a review of a work 108. For the sake of differentiation, these types of comments may be referred to as "reviews." In this architecture 100, the comments 112 are associated with a particular work 108. The comments 112 may be appended to the work as metadata, linked to the work through the use of a common identifier, etc.

The architecture 100 and community may be maintained by one or more computing devices(s) 116. The computing devices 116 may be implemented as server computers, a cloud-based system of distributed computing functionalities, a single desktop computer or the like. Data provided to the community such as works 108 and comments 112 may be stored on the computing devices 116 or in storage accessible by the computing devices 116. Generation of the appropriate user interfaces, computations, calculations, responses to search queries, and the like may be implemented by functionalities maintained on the computing devices 116. The authors 102, readers 104 and contributors 106 may access the computing devices 116 through a network 118. The network 118 represents any type of communications network such as the Internet, a wide area network (WAN), a local area network (LAN), a telephone network, a cable network, a mesh network, a peer-to-peer network and the like.

Illustrative Computing Device(s)

Figure 2:
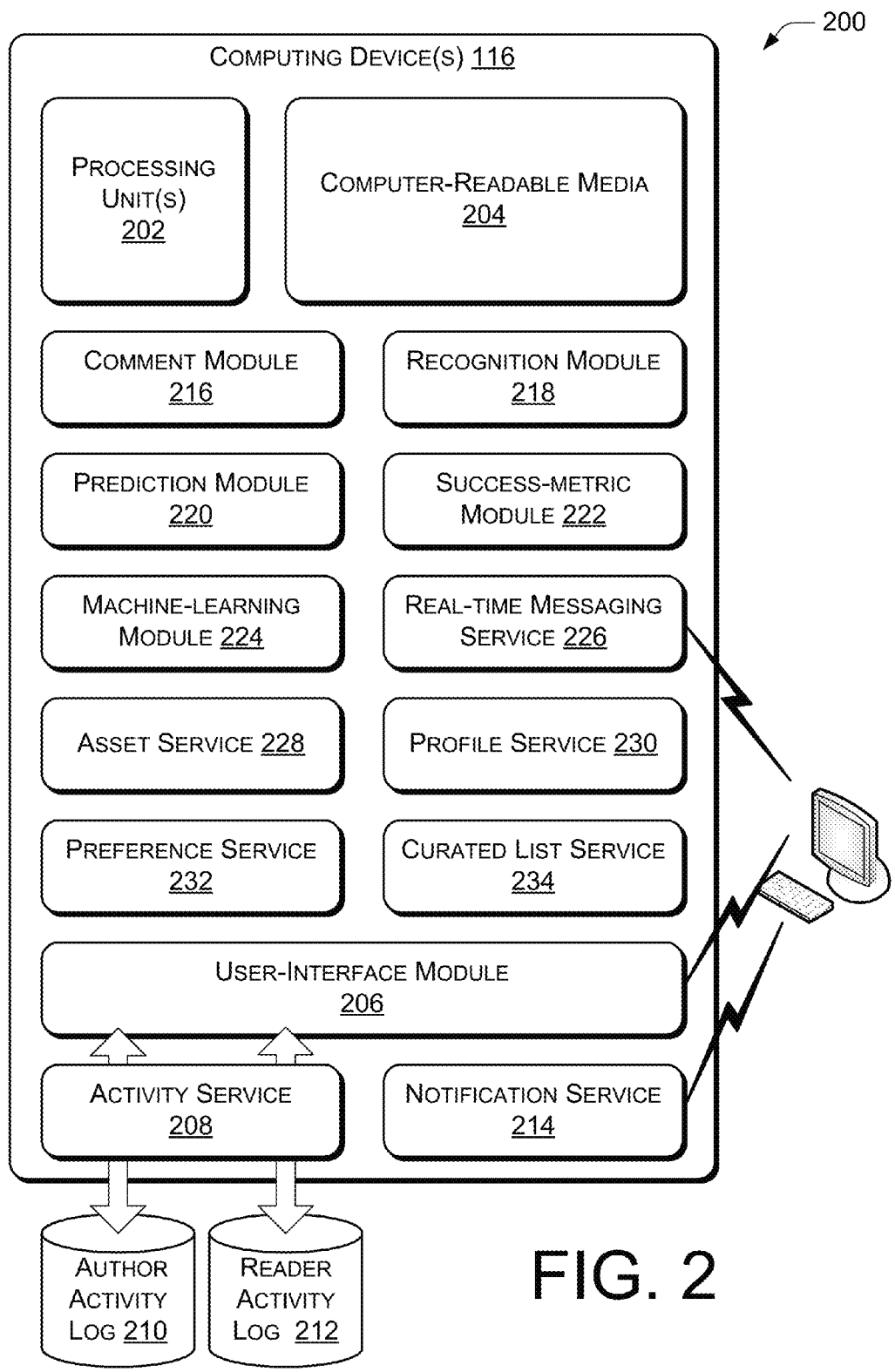
FIG. 2 is an example diagram of the computing device(s) of FIG. 1.

FIG. 2 shows a schematic block diagram 200 of components that may be present in the computing device(s) 116. Although shown in the diagram 200 together in a single grouping, it is to be understood that the various components of the computing devices 116 may be distributed across multiple pieces of hardware and multiple physical locations. The computing devices 116 comprise one or more processing units 202 and computer-readable media 204. Individual ones of the processing units may be implemented as hardware processing units (e.g., a microprocessor chip) or software processing units (e.g., a virtual machine). The computer-readable media 204 may be implemented in hardware or firmware. The computer-readable media 204 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store information and which can be accessed by a processing unit. Computer-readable media 204 encompasses non-transitory computer-readable media. Non-transitory computer-readable media includes all types of computer-readable media other than transitory signals. The computing devices 116 also contain multiple modules. The modules may be implemented as software stored in the computer-readable media 204 (or elsewhere), firmware, hardware, a system-on-a-chip (SOC), mechanical computing devices, etc.

A user-interface module 206 makes human-usable information available to the users of the computing devices 116 such as the authors 102, readers 104 and contributors 106. The user-interface module 206 may generate user interfaces for transmission to receiving devices such as thin clients. The user-interface module 206 may also generate instructions, such as hyper-text markup-language (HTML) or other markup language code that are sent to client devices for rendering on user interfaces. Thus, the user-interface module 206 is to be understood as including functionalities to both directly create user interfaces itself as well as to generate and send instructions that cause another device to create a user interface. The user-interface module 206 may also receive data, instructions, commands, indications etc. from authors 102, readers 104 and contributors 106.

The user-interface module 206 may make the work 108 available to the readers 104 and other users in the community. The user-interface module 206 may also receive an indication that an author 102 performed an activity related to one of his or her works 108. In some instances, some of the functionality of the user-interface module 206 may be implemented via browsers presenting markup language content (e.g., webpages) or on specialized applications that also present markup language content and/or interface directly with the computing device(s) 116 via, for example, an application programming interface (API). Types of activities may include the author 102 posting a pitch for a new work, posting a portion of a work (e.g., a single chapter of a story), posting an entire work (e.g., a whole poem), indicating that a work which was previously in draft form is now complete, responding to a comment 112 provided by a contributor 106 or other types of activities. When a contributor 106 posts a comment 112 about the work 108, the user-interface module 206 may present the comment 112 in association with the work 108 in user interfaces such as an author-facing user interface directed towards the author 102 whose work 108 was commented upon and a reader-facing user interface directed to other users that may be interested in seeing the comment 112 while reading the work 108.

An activity service 208 may recognize events and activities received by the user-interface module and create records in a storage location when an event or an activity occurs. For example, the activity service 208 may recognize a call from a computing device of a user and create a record of an event that occurs as a result of the call. The call may be generated by user interaction with the user-interface module. Various activities may be performed in response to information, commands, instructions etc. received from an author 102, a reader 104, a contributor 106 or other user.

An "event" is an action within this architecture that represents an entity affecting a target entity in some way. The way in which the target entity is affected determines the "type" of event. Thus, each event may contain identification of resource entity, a type of the event (i.e., what happened) and a target entity on which the recipient of the event. For example, the activity service 208 may create an event based on comment 112 received about a work 108. In some implementations, events may not be changed once created, though they can be deleted. An "activity" is a collection of events. Grouping events together as activities allows for the representation of actions that are composed of multiple component parts. For example, an author 102 may add a new chapter to a work 108 and modify an earlier chapter of the same work 108. These are two separate events, but the two events may be recorded as a single activity in the record of change history for the work 108.

Each time an activity occurs, the activities service 208 generates an activity missive that may be published through a simple notification service (SNS). Publication of an activity allows other services and modules to act upon that change. The activity missive indicates whether an activity was created or an event was deleted and also indicates one or more of event types that are included in the activity. When an author 102 performs an activity related to one of his or her works 108, that activity may be consumed and a record created in an author activity log 210. When a reader 104 or contributor 106 performs an activity, those activities may be recorded in a reader activity log 212. The activity service 208 may mediate communication between the user interface module 206 and one or both of the author activity log 210 and reader activity log 212. Thus, rather than immediately acting on activities as detected by the user-interface module 206, the activities may be first recognized as events then the events may be stored as log entries in either the author activity log 210 or the reader activity log 212. Although discussed here as two separate logs, the author activity log 210 and the reader activity log 212 may be unified into a single storage location. A notification listener, that may be optionally located within the activity service 208, may review each activity missive to determine which ones contain relevant events. Each type of event may be processed by a different notification listener which will have logic appropriate for the given type of event.

The activity service 208 may also identify those users who previously selected to receive notifications when there is activity associated with that author 102 or with that work 108. For example, when a user chooses to follow an author 102 or a work 108, the user (and other users following the same entity) may receive a notification whenever there is activity or event related to the followed entity (e.g., for user following a book he or she may receive a notification when a new chapter is added to the book). Activities relating to a particular entity (e.g., the author 102) may be exposed in activity feed that is shown in association with a profile of the entity or a collection of details about a work 108. Activity feeds may initially include a listing of all events activities, but activity feeds can be filtered in a variety of ways.

A notification service 214 may send notifications of activities and events to the users identified by the activity service 208. The notifications may identify the author 102, the work 108 and the type of activity. As mentioned above, a notification may be sent as activity missive through SNS from the activity service 208. In some implementations, the notifications may contain only these three pieces of information without providing the content of the activity (e.g., the contents of a comment). A notification represents an intention to notify a user of an activity or event that has occurred within the architecture. Deletion of notifications may be limited by global retention configuration settings, but notifications may be hidden by users. By processing incoming activities through the activity module 208 and storing records in the activity logs 210 and 212, then generating notifications from the records in the logs 210 and 212, the computing devices 116 are able to quickly process and disseminate a large number of notifications.

Users may receive notifications through a feed channel that displays notifications on a portion of the user interface. The users can manually configure which types of events and activities appear as notifications in their respective feed channels. Notifications may also be sent to users via email. In some implementations, the emails may be sent on a schedule and notifications may be batched and then sent out when the next email is scheduled to be sent. For example, a contributor 106 may receive a notification in response to the author 102 selecting a comment 112 of the contributor 106 and providing positive feedback on that comment 112.

A comment module 216 can receive comments 112 corresponding to (e.g., providing feedback, etc.) a work 108 from contributors 106. The comment module 216 may associate the comments 112 with the work 108. The comment module 216 may also instruct the notification service 214 to send a notification to the author 102 communicating that a comment 112 has been received about his or her work 108. Records of the comments 112 may be stored in the reader activity log 212 as having an association with the work 108.

A recognition module 218 assists authors 102 in providing recognition to those contributors 106 who have made meaningful or helpful contributions to a work 108. Providing recognition to contributors 106 encourages contributors 106 to participate in the community and by tracking and publicly exposing the recognition this can also help other users in the community identify those contributors 106 with relevant skills or expertise. The recognition module 218 may associate a token with an account of a contributor 106 in response to the author 102 flagging, selecting or otherwise indicating a particular comment 112. The author may flag, select or indicate the particular comment 112 because that comment was helpful to the author 102 or for any other reason. The token may be represented in user interfaces as a credit, point, coin, kudos, etc. The computing devices 116 may store the token as a small string of data associated with an account of the contributor 106. Contributors 106 may receive one token for each instance that an author 102 chooses to recognize one of their comments 112.

The token may be provided for a particular type of contribution such as a contribution for providing cover artwork, a plot suggestion, editing help, subject matter expertise or the like. When selecting a comment 112 to recognize or "give kudos" for, the author 102 may also enter the type of contribution or select the type from a list of contribution types. Thus, the author 102 may select a check box on a comment 112 to give a token and then select a category of token from a list.

Readers 104 looking at a reader-facing user interface presenting a work 108 may see a plurality of comments 112 that are associated with that work 108 arranged in order based on the number of tokens received by the contributors 106 that provided those comments 112. For example, contributors 106 that have received the most tokens may have their comments 112 provided at the top of a list of comments. The recognition module 218 may also determine a score for a contributor 206 based on a number of tokens associated with the account of the contributor 206. For example, a contributor 206 with more than 50 tokens in a particular category may receive the "score" or label of expert. This type of score or label may be represented as a badge associated with the contributor 206. The badge may appear in user interfaces near the name of the contributor 206.

Additionally, the user-interface module 206 may change the way comments of the contributor 206 are presented in a user interface in response to the number of tokens associated with the account of the contributor 106 accumulating a threshold number. Returning to the previous example, if the threshold number is 50 then contributors 206 with more than 50 tokens may have their comments 112 shown in bold or otherwise rendered with greater prominence than other comments. Selective emphasis of comments 112 with greater prominence may occur together with or separate from the ordering comments 112 based on contributor 106 tokens.

The recognition module 218 may also provide recognition to users for activities that they have performed. For example, an author 102 may receive recognition for having finished his or her first work 108. A reader 104 may receive recognition for having finished reading 25 works 108. Users may be recognized as having an "achievement" in a category such as authoring works 108 or reading works 108. The activity service 228 may be a source or even the sole source of information for determining achievements. One type of recognition may be a badge associated with an achievement. There can be multiple achievement levels for activities, so a user may receive different types of badges indicating increasing accomplishments (e.g., a first badge for reading 25 works 108 and a second badge for reading 50 works 108). Records of activities that led to an achievement or badge may be tracked and surfaced so that users can see how they or someone else earned the achievement.

A prediction module 220 may predict the likelihood that the author 102 will complete a final draft of the work 108. This prediction is based on data in the author activity log 210. Thus, data from the author activity log 210 such as the author posting a new portion of the work 112 (e.g., posting the next chapter), modifying the work (e.g., by editing), removing a portion of the work, viewing a comment about the work, responding to a comment about the work and the like. In some implementations, a higher number and higher frequency of interactions may be interpreted as suggesting a higher likelihood that the author 102 will keep writing and ultimately complete the work 108. The calculation performed by the prediction module 220 is dynamic and variable. Conversely, inactivity may be interpreted as the author 102 possibly abandoning the work. Thus, the prediction module 220 may decrease likelihood of completion dramatically if there is no activity from the author 102 regarding the work 108 for several months.

The author activity log 210, may also include a completion number representing a number of works 108 for which the author 102 has completed a final draft and an abandoned number representing a number of works 108 for which the author 102 did not complete a final draft. For example, if the author 102 completed a final draft of three works and did not complete a final draft of six works then his or her completion number would be 3 and his or her abandoned number would be 6. These numbers may be made into a ratio such as completion number over abandoned number. Using the example above, the ratio would be 0.5. Thresholds could be created from the ratio such as "unlikely to finish" for ratios less than 1, "moderately likely to finish" for ratios from 1 to 2 and highly likely to finish for ratios greater than 2. The specific ratio thresholds and names are merely illustrative.

A success-metric module 222 may calculate a success metric for the work 108 using algorithm based on interactions between the readers 104 and the work 108. The success metric may represent a prediction that the work 108 when finished and shared beyond this community will be popular with readers. Interactions that may affect the success metric include readers reading part of the work, reading the entire work, rereading at least a portion of the work, marking the work as a favorite work, sharing the work with another person, purchasing the work and the like. The algorithm may compute a sum, average, median, mean or other value from numerical values derived from comments and from numerical values assigned to the interactions of the readers 104 with the work 108.

The interactions may be tracked by recording the number of instances of each type of interaction as well as tracking other metrics such as time spent reading by readers (both total and average). The time spent reading may be calculated for all readers and compared against a threshold amount of time. For example, a work 108 that users have spent in total more than 100 hours reading may receive a first level of ranking and a work 108 that users have spent more than 500 hours reading may receive a second level of ranking. One type of interaction that may be considered by the success-metric module 222 is the creation of comments 112. Comments 112 received by the comment module 216 may affect the success metric. The prediction represented by the success metric is a forecast of how well the work will be received by a larger audience of readers beyond the collaborative community described herein. The concept of the work 108 being popular with readers 104 may also include a financial component and the prediction may suggest to what extent a given work is likely to have commercial success.

The success metric may change as the work 108 changes and as reader 104 interaction with the work 108 changes. When the success metric changes, the notification module 214 may notify the author 102 of the change. In some implementations, the success metric may be exposed only to the author 102 of the work 108. Keeping the success metric hidden from other users may encourage honest evaluation and interaction (e.g., commenting) with the work without any bias introduced from knowing the success metric.

Works 108 may be ranked based on their relative success metrics. For example, the work 108 with a highest success metric may be shown on a main portion of a user interface such as a home page of a website. A list of the top N ranked works, such as the top 50 or top 100 works 108. This list may be available to all users. Since the success metric is based on reader activity the success metrics for works 108 are dynamic and change over time. The ranking of works 108 may be re-calculated and posted periodically such as every 24 hours, every seven days or any other interval of time. Because the rankings are dynamic, the ranking of a work 108 may change and move up or down the list. The author 102 of a work 108 may be notified every time his or her work 108 changes position in the rankings. The author 102 may also be notified when the rank of his or her work 108 is approaching a threshold. For example, an author 102 may receive an automatic notification that his or her work 108 is ranked number 51 and about to enter the top 50. Showing an author 102 how his work 108 is changing in the rankings may encourage the author 102 to put more effort into the work 108 to improve the rank.

A machine-learning module 224 may modify an algorithm used for calculation of the success metric based on actual success and the real-world response to works 108 that were previously evaluated using algorithm. The machine-learning module 224 may use any type of machine learning techniques or artificial intelligence which makes it possible to compare predicted results with observed data and infer modifications that can be made to the algorithm in order to bring future predictions closer to actual observed results. For example, information about the success in terms of sales numbers, revenue generated, number of printings and the like may be obtained for a work 108 that was completed and/or published to a broader audience beyond this community. The actual "success" of that work 108 may be compared with the previously-calculated success metric. When the success metric under- or overestimates the actual success of the work 108, the machine-learning module 222 may adjust the algorithm(s) used to calculate the success metric.

Providing authors 102 with the success metric may help an author 102 to know how his or her work 108 will likely be received before expending the effort to complete the work. An author 102 may choose to abandon a writing project if the success-metric module 222 assigns a low likelihood of success. Alternative, an author 102 may be encouraged to keep writing if he or she learns that the work 108 has a good chance of being successful.

A real-time messaging service 226 may provide a way for the various users in this community to communicate with each other. By managing the real-time messaging as part of the architecture of this community, the users may be able to communicate with each other while maintaining privacy. The real-time messaging service 226 may also limit which users are able to contact which other users. For example, real-time messaging may be enabled between authors 102 and contributors 106 that have provided feedback, or the content submission, on a work 108 of the author 102. The real-time messaging service 226 may also expose status of users as logged in to the community or not. Thus, a contributor 106 may be able to observe the author 102 is logged into the community and then initiate a real-time chat the author 102 to provide further suggestions, discuss a comment previously provided by the contributor 106, etc. The real-time messaging service 226 may limit communication between users in other ways, such as, for example only allowing those contributors 106 whose comments 112 have been flagged by the author 102 as being useful.

An asset service 228 stores metadata about works 108, pitches, comments 112, content contributions 114 and other data within the architecture. The data itself (e.g., actual files) may be stored separately in a system that uses both automated and/or manual tools for identification of copied, plagiarized and inappropriate content. Authors 102 may designate works 108 as either in progress, shared with a limited group of users, or shared with substantially all other users through use of sharing setting. Use of metadata stored by the asset service 228 can designate which files are publicly available and which are still in progress by associating "draft metadata" to works 108 that are still in progress and by associating "shared metadata" with works 108 that are shared. They work 108 may have multiple segments (e.g., book chapters), and associated pitch, and associated content (e.g., cover art). Thus, they work 108 may represent the submitted content of the work 108 as well as the metadata and any associated content. The metadata may indicate which user created a particular item. Thus the work 108 may include text of a fictional story that is created by an author 102 but also cover art created by a contributor 106. Additionally, comments 112 about the work 108 may be associated with the work 108 by metadata that indicates the association. Metadata can also indicate the category of a work 108 such as, the contents of stories, fiction or nonfiction. Works 108 may also be associated with audience appropriateness ratings (e.g., G, PG, PG-13, R) through use of the metadata.

If author 102 chooses to share draft content then metadata indicating that the content is still in progress may be changed to indicate that the content is now shared. Differences between content associated with in-progress metadata and content associated with shared metadata enables the creation of different user interfaces for an author 102 and other users such as readers 104 and contributors 106. For example, an author-facing user interface may shows content that has metadata indicating both draft and shared status. However, a reader-facing user interface may surface only content associated with shared metadata.

Since works 108 themselves are stored in a separate location, systems accessing this architecture may download works 108 directly from the place they are stored. Uploading requests by authors 102 may be sent to a universal resource locator (URL) that is specified for receiving uploads. Following upload, the work 108 or portion thereof may be passed to the asset service 228. Prior to allowing the upload and association of new content with a work 108, the asset service 228 may conduct one or more ownership checks to ensure that only the author 102 can upload content to his or her work 108.

A profile service 230 stores or manages storage of user profiles for the authors 102 readers 104, and contributors 106. The profile service 230 may associate metadata (e.g. name, profile picture location, description of the user, physical location of the user, date and time when the profile was created, preferences, works authored, etc.) with the profiles. Users may initially create a profile at the time of first accessing this architecture. Some data stored in the user profiles may be provided directly by the users such as a username and a profile picture. Other information may be automatically associated with a profile based on activity and choices of the user. For example, when a user uploads a new work 108 (e.g, sends the work 108 to the asset service 228), metadata indicating that that work 108 is authored by the user may be automatically associated with that user's profile.

A preference service 232 may be a component of the profile service or an independent service. The preference service 232 manages storage user preferences. The preferences allow a user to customize his or her interactions with architecture. For example, a user could indicate a preference for notifications regarding new works in the science fiction genre. The user can also indicate a preference to have comments 112 on his or her works from certain categories the contributors 106 hidden so that those comments do not appear in an author-facing user interface. Use of a preference service 232 that is distinct from the profile service 230 may allow for application of global preferences across other systems and architectures (e.g., default language, text size, etc.).

A curated list service 234 provides a system for management and storing of lists. The lists may be implemented as universal resource indicators (URIs). The curated list service 234 may maintain lists of works 108 that are popular amongst users of the architecture. Popularity may be based in part on a number of reads, a number of comments, a number of recommendations etc. A list of trending works may also be managed by the curated list service 234. Trending works may be works 108 that have recently changed a positive way. For example, works that have had a greatest increase in a major of popularity during a preceding time period such as the previous day the previous week may be surfaced in a list of trending works. Also, works 108 that have recently received input of effort from authors 102 such as addition of a new chapter, sense of editing, indication by the author of the draft being finalized and the like may be indicated as trending works. These, and other, lists may be surfaced on a home page or top page of a website or application.

The computing device(s) 114 may include additional modules beyond those discussed above and any of the modules discussed herein may be omitted or combined.

Illustrative User Interfaces

Figure 3:
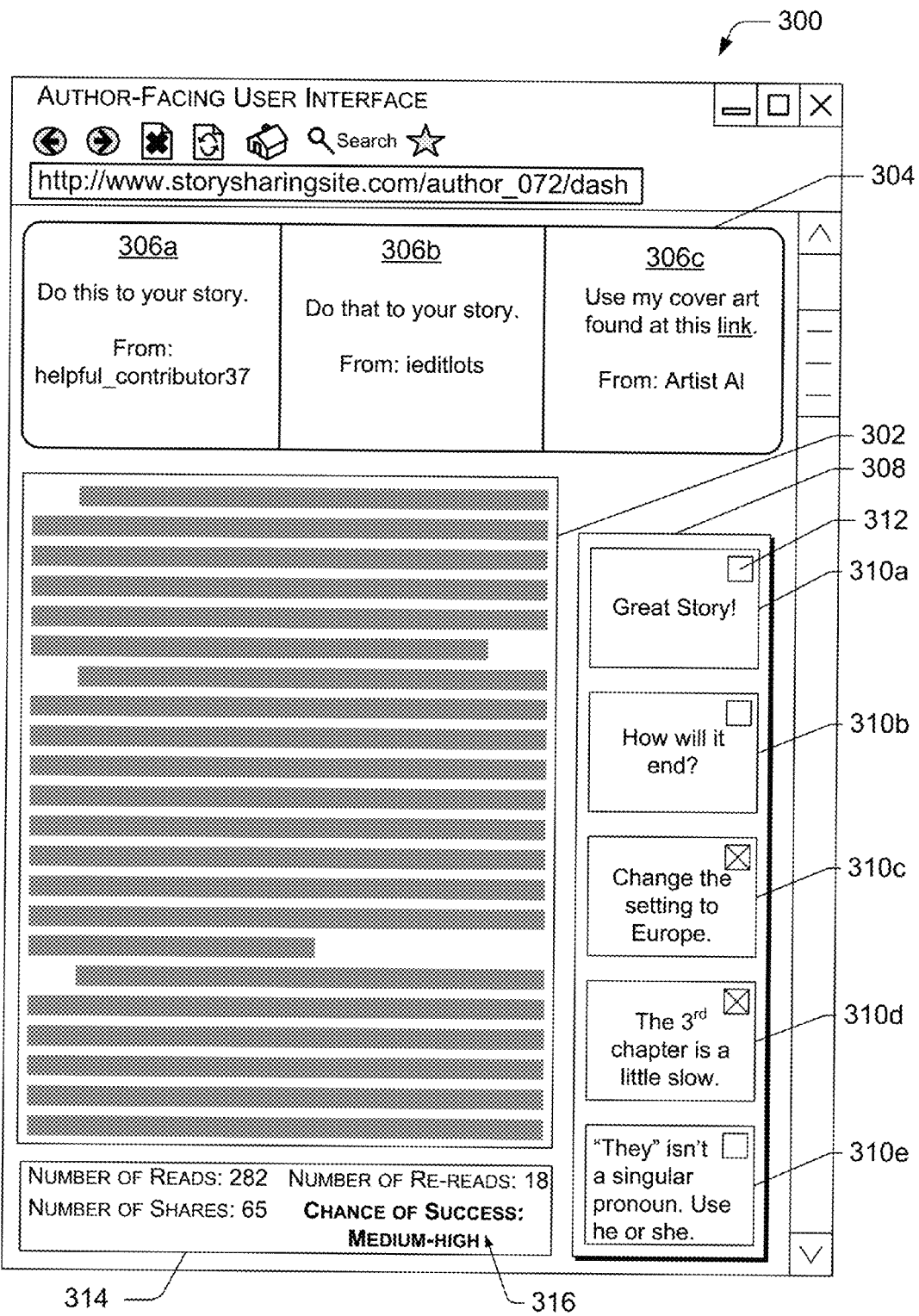
FIG. 3 is an example representation of an author-facing user interface.

FIG. 3 shows an example author-facing user interface 300. In the author-facing user interface 300, an author 102 may upload his or her work 102, or portion thereof, and the work 108 is displayed in a work editing window 302. The author may edit work in this user interface 300 and when he or she is satisfied that the work is ready for sharing, authorize sharing of the work 108 with other users. The author 102 may make edits to the work 108 in this window 302 or even type an entire work 108 directly into this window 302. This architecture may provide a different page (or other user-interface structure) for each work 108. The author 102 may also post alternative versions of a work such as two different endings to a fictional story. Author 102 may create a poll asking readers 104 and contributors 106 which of the two (or more) alternative versions of the work is preferred. In some implementations, the comment module 216 may receive the answers to the poll.

The author-facing user interface 300 may also provide a portion 304 of the user interface 300 for the author 102 to place comments 306 that the author 102 intends to refer to while writing or revising his or her work 108. The comments 306 may be associated with a specific portion of the draft of the work 108 by the contributor 106 who provided the comment 112 (e.g., similar to a "sticky note" placed on a particular portion of a paper document). These types of comments, represented here by comments 306*a*, 306*b* and 306*c* (collectively comments 306), may be considered important comments for the author 102 because the author 102 has elected to look at these comments 306 while writing. The comments 306 may include a suggested modification of content included in a draft of the work 306*a*, suggested edits to the draft of the work 306*b* and a suggested graphic to accompany the draft of the work 306*c* as well as other types of comments. In this example, these comments 306 are presented in the author-facing user interface 300 with increased prominence due to their location in the portion 304 spanning the top of the user interface 300. The prominence of these comments 306 may also be emphasized in other ways such as by bolding text, changing a color of the comment boxes and the like.

The author-facing user interface 300 may also include a portion 308 of the user interface which displays other comments 310 from contributors 106. These comments may include comments that merely provide superficial feedback 310*a*, provide a query that is not particularly helpful to the author 310*b*, suggest a modification to the work 310*c*, provide a critique or criticism of the work 310*d* or provide an edit 310*e*. Although only five comments 310*a*-310*e* are shown here, the author-facing user interface 300 may present any number of comments 310 to the author 102. There may also be a user-interface element 312 associated with each comment 310 through which the author 102 may select or flag the comment 310 as being meaningful or helpful to the author 102 for the creation of the work. In this example, the author 102 has selected comments 310*c* and 310*d*.

The author 102 may additionally or alternatively choose to select one of the comments 310 for reference while revising the draft of the work 108 by, for example, dragging the comment from portion 308 to portion 304 of the user interface 300. Drag-and-drop is but one illustrative way of selecting a comment for reference while revising the work 108. Thus, comments may be flagged in at least two different ways: as comments that are helpful to the author 102 such as comments 310*c* and 310*d* or as comments that the author 102 chooses to reference while writing such as comments 306*a*-306*b*. It may be likely, but is not necessary, that the comments 306 the author chooses to reference while writing are also comments that the author has selected as being helpful. With either example of selecting specific comments, the contributor 106 who provided the comment 306 and/or 310 may receive a notification that the author 102 has flagged his or her comment 306 and/or 310. This notification may be provided by the notification service 214.

The user interface 300 may accommodate only a limited number of comments 306 in the portion 304 of the user interface that gives increased prominence to those comments 306 that the author 102 has chosen to reference while revising the draft of the work. In this example, the portion 304 of the user interface 300 can accommodate only three comments 306*a*-306*c*. The number of comments 306 may be limited for the work 108 as a whole and/or for specific portions of the work 108. For example, the work 108 may be limited to have a total of 20 comments 306 associated with it at any one time and only 3 comments associated with any chapter of the work 108. The author 102 may be prevented from selecting (i.e., dragging and dropping into portion 304) additional comments until the author 102 unselects one of the comments previously selected for reference. This may keep the list of comments flagged for reference while writing relatively small and up to date. Thus, the comment selected/flagged for use by the author 102 while writing may change frequently as the author 102 edits his or her work 108 and by showing which comments the author 102 has selected/flagged, other users may gain insight and be able to observe some of the author's 102 writing process. Once the author 102 finishes revising the draft of the work 108 based on one of the comments 306, the author 102 may unselect the comment, or the system may automatically cease the selected status of the comment, in response to an indication of the author 102 such as deleting the comment 306 from the portion 304 of the user interface 300. This may also create space for the author 102 to drag a different comment 310 into the portion 304 of the user interface 300.

In addition to comments 306 and 310, the author-facing user interface 300 may present metrics 314 about reader interaction with the work 108. The metrics 314 may include such things as a number of times the work 108 was read, a number of times a reader 104 reread the work 108, a number of times a reader 104 chose to share the work with another and the like. The metrics 314 about reader 104 interaction with the work 108 may be used to generate a success metric 316. The success metric 316 may be generated by the success-metric module 222. The success metric 316 may also be based on the content of comments 306 and 310. For example, a high number of positive comments may increase the success metric 316. Positive comments may be identified as such by automated analysis of the text of the comments using techniques such as natural language processing. For example, in comment 310a the word "great" may be interpreted as indicating a positive comment by the use of natural language processing.

In this example, the success metric 316 is shown as "medium-high." The success metric 316 may be computed numerically or as a percentage (e.g., 50% chance of being well received by readers) and then converted to a textual or graphical representation. For example, a medium-high chance of success may correlate with 70 to 85% likelihood that the work 108 will sell more than 100,000 copies if published. This success metric 316 may be shown only on the author-facing user interface 300 and not on user interfaces viewable by other users.

Figure 4:
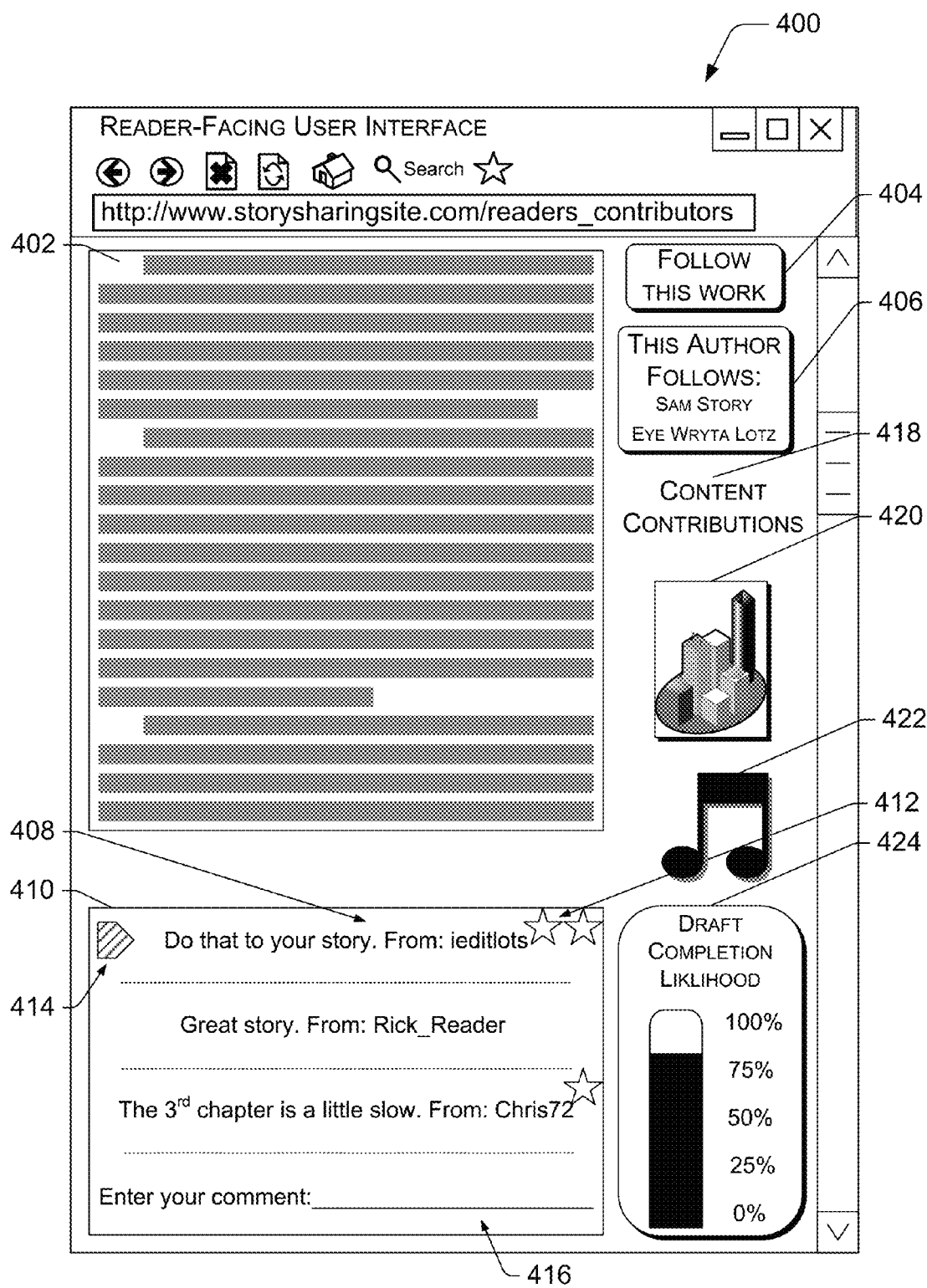
FIG. 4 is an example representation of a reader-facing user interface.

FIG. 4 shows an example reader-facing user interface 400. Both readers 104 and contributors 106 may be presented with this user interface 400. The reader-facing user interface 400 includes a portion 402 containing the work 108. Each reader 104 or contributor 106 reading the work 108 may see the same reader-facing user interface 400. Each separate work 108 may be associated with its own user interface. The reader-facing user interface 400 may also include a button 404 or other selectable user-interface element that a user can select in order to receive notifications for activities associated with the work 108. For example, by choosing to "follow" a work 108 a reader 104 or contributor 106 may receive notifications every time the author 102 interacts with his or her work 108. The reader-facing user interface 400 may also show a follow list 406 or other indication which shows other authors or other works that the author 102 is following. Thus, when the author 102 himself or herself chooses to receive notifications about the other authors or other works (i.e., "follow") that preference of the author may be presented to other users.

In some implementations, a work may only be available to a subgroup of users selected by the author. For example, the author may choose to share initial drafts of a work only with other authors, only with contributors that have provided comments on earlier versions of this work or on other works of the author or with some other subgroup. For example, contributors may be encouraged to comment on a work by receiving access to additions (e.g., new chapters etc.) to the work prior to other users. In order to promote broad community and sharing, works that are limited to only a subgroup of users may be automatically made available to all users in the community after the lapse of a predetermined time period. For example, new works or new changes to a work may be limited to a select subgroup of users only for two weeks before the work automatically becomes open to everyone.

Comments 408 associate with the work 108 may be shown together with the work 108 in a separate portion 410 of the user interface 400. These comments 408 may be the same comments that the author 102 sees in the author-facing user interface 300. Comments 408 from a contributor 106 that has received recognition for his or her comments (but not necessarily for this comment) may be shown differently in this portion 410 of the user interface 400. For example, the two stars 412 may correlate with a number of tokens received by the contributor "ieditlots." Different numbers of stars (or any other type of change to a presentation in the user interface 400) may be used to indicate the relative number of tokens that a contributor 106 has received. In some implementations, the portion 410 of the user interface 400 displaying the comments 408 may have the comments 408 ordered or sorted by the number or tokens held by the contributors 106 that posted the comments. For example, comments by contributors 106 with the most tokens may be presented first. Contributors 106 that receive tokens for contributions made to other stories may keep those tokens perpetually and have those tokens represented in multiple ways throughout the community.

Comments 408 that are flagged for reference by the author 102 to use while writing on his or her work 108 may also be indicted as such by techniques that include putting a symbol 414 next to the comment 408. Thus, users looking at the reader-facing user interface 400 may be able to see which comments 408 the author 102 is actively referencing. These symbols 414 (or other technique for marking the comments 408) will be added and removed from a comment 408 based on the author's flagging and unflagging of that comment 408 in the author-facing user interface 300. Thus, the status of a comment 408 as being flagged with this symbol 414 may change frequently.

The portion 410 of the user interface 400 for displaying comments may also include a field 416 for a contributor 106 to enter and post a comment 408. The contributor 106 may associate the comment 408 with the work 108 as a whole or with a specific portion of the work 108 such as the portion of the work 108 currently displayed in portion 402 of the user interface 400. In some implementations, the author 102 of a work 108 may receive a notification whenever a contributor 106 posts a new comment 408 about the work 108.

In addition to comments 404, contributors 106 may also provide content contributions 418. The content contributions 418 may include such things as cover art 420 for the work, audio 422 to accompany the work, a translation of the work, a font for rendering text of the work, an alternative version of a portion of the work, a video or the like. The content contributions 418 may be unsolicited contributions that are not requested by the author 102, but rather are provided by a contributor 106 for consideration by the author 102 as well as other members of the community. The content contributions 418 may be provided by the contributor 106 uploading a file to the computing device(s) 114. Once uploaded, the content contributions 418 may be associated with the work 108.

The reader-facing user interface 400 may also present a draft completion likelihood 424 representing a likelihood that the author 102 will complete a final draft of the work 108. The draft completion likelihood 424 may be determined by the prediction module 220. In this example, the draft completion likelihood 424 is shown in terms of percentages although other types of representations are also possible. Providing the draft completion likelihood 424 on the same user interface as the work 108 makes it easy for readers 102 to identify if a given work is something they wish to invest their time in reading.

Figure 5:
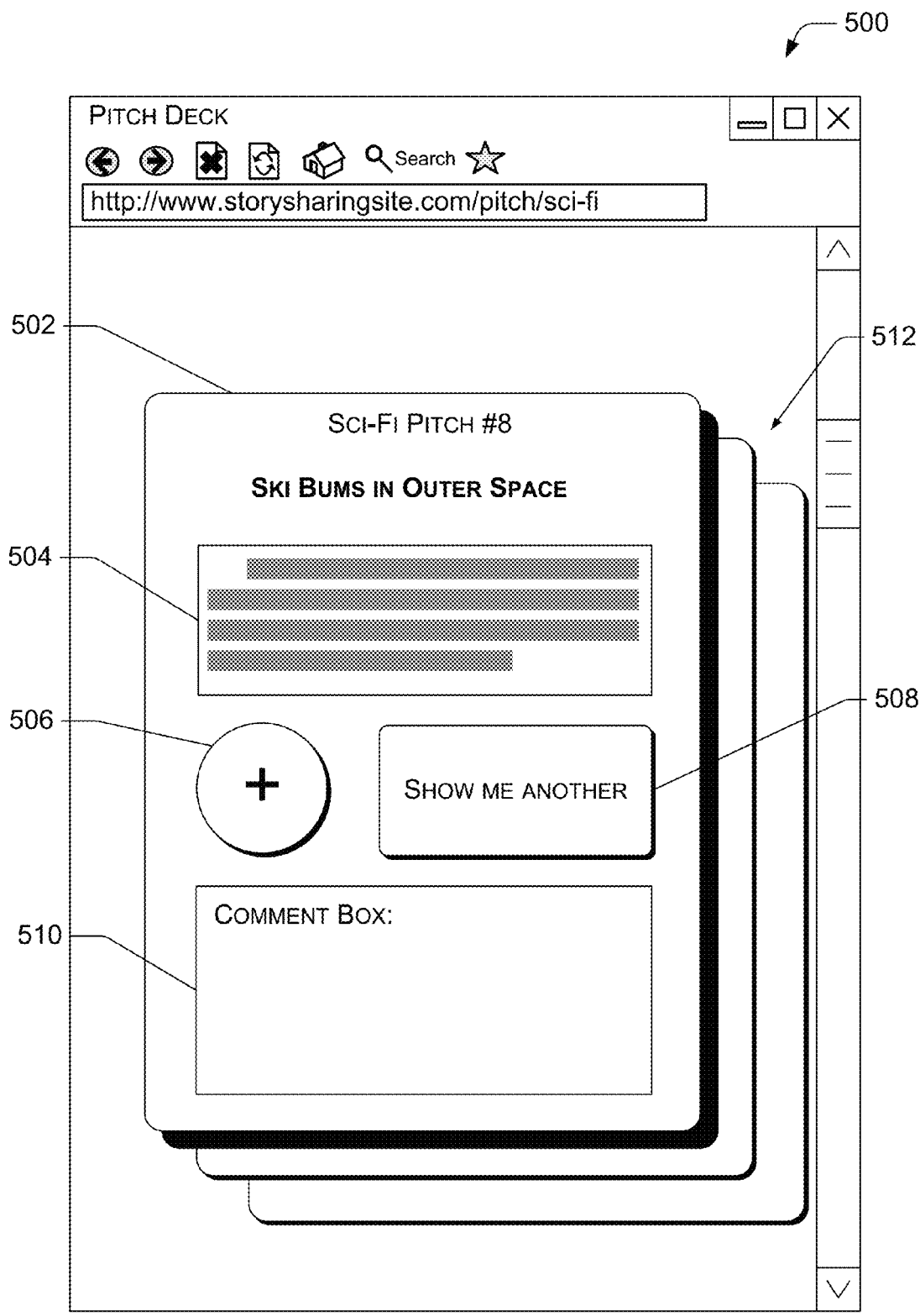
FIG. 5 is an example representation of a user interface for surfacing and receiving feedback on pitches for stories or other types of works.
Figure 6:
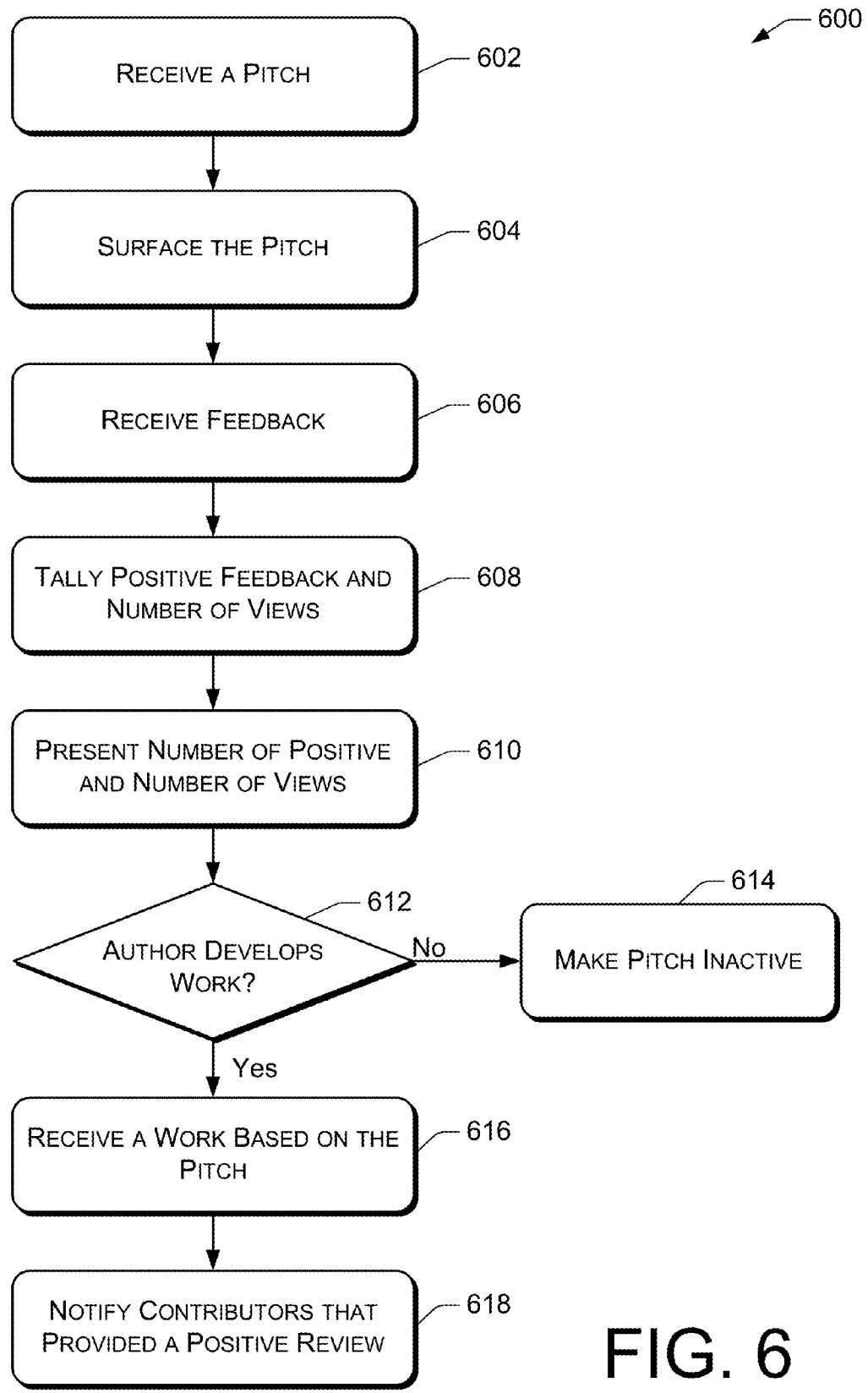
FIG. 6 shows an example process for receiving feedback on a pitch.

FIG. 5 shows an illustrative user interface 500 for users (e.g., contributors 106) to provide feedback on pitches. Pitches generally comprise short statements describing an idea for a work 108 that an author 102 is contemplating writing. By receiving simple feedback from multiple users on a pitch, an author 102 may readily obtain a sense of interest in the idea being pitched and compare the strengths of different ideas by submitting multiple pitches for consideration.

This user interface 500 includes a window 502 showing a single pitch. The window 502 may include context for the pitch such as a description of what type of work the author 102 is proposing to create, a title for the work, and the content of the pitch 504 itself. When reviewing the pitch 504 users are also presented with user interface elements to rate the pitch. The user interface elements may be configured as a first button 506 to indicate a positive evaluation of the pitch 504 and a second button 508 to see the next pitch. The first button 506 may be marked with an indicia associated with a positive evaluation such as a plus sign, the word "yes", a thumbs up symbol, a smiley face, green coloration, etc. The second button 508 may be marked with a command to show another pitch. In this example user interface 500, users are presented with a choice between the positive button 506 or the show-next-pitch button 508. The user interface 500 may be created such that users are not able to directly provide negative feedback. The act of selecting the "show me another" button 508 may suggest negative or at least not positive feedback. In other implementations, the users may be given a larger selection of choices such as a negative evaluation option or a "neutral" or "no opinion" button representing neither a positive nor a negative opinion. The users may alternatively be presented with a user interface that allows for selection of a numeric value such as from 1 to 5 representing how much interest they have in the pitch 504.

In some implementations, the window 502 may also include a comment box 510 in which the users can provide comments in addition to their rating of the pitch 504. For example, a user may activate the button 508 corresponding to a negative opinion and then provide a comment in the comment box 510 telling the author 102 what changes would cause the user to instead select the button 506 corresponding to a positive opinion. After rating a pitch 504, and optionally entering a comment in the comment box 510, the user interface 500 may immediately present the user a different window 512 showing a another pitch. Thus, the user-interface 500 may create the visual appearance of flipping through a series of cards each card containing a separate pitch. In some implementations, the act of selecting one of the buttons 506 or 508 may cause the window 502 to be replaced by one of the next windows 512. This allows the users to rapidly review a large number of pitches 504.

An author 102 who has submitted a pitch 504 may receive a number of responses both positive and negative from users who have reviewed the pitch. These responses may be tallied and presented to the author 102. Authors may judge based on the relative numbers of positive and negative responses whether to proceed with drafting a work 108.

Illustrative Processes

The processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. illustrates a process 600 for receiving feedback on a pitch. At 602, a pitch for a work that an author proposes to create may be received for consideration by a community of users.

At 604, the pitch may be surfaced to a plurality of contributors. In some implementations, the pitch may be surfaced in a user interface such as the user interface 500 shown in FIG. 5. The user-interface 500 provides one example (e.g., a visual representation of flipping through "cards" of pitches) of how the pitch may be surfaced as one of a plurality of pitches that are presented to the plurality of contributors in immediate succession after each other.

At 606, feedback may be received from all or some of the plurality of contributors that viewed the pitch. The feedback may rate the pitch by the contributors making a selection of a positive review of the pitch. Selection of a positive review of the pitch may indicate that the user would read a work developed from the pitch. Feedback may also be a request to see a different pitch. Thus, a user presented with a pitch that does not interest him or her can quickly go to a next pitch pausing only to provide feedback for those pitches that interest him or her.

Alternatively, the feedback may be received by the contributors selecting a number that corresponds to a strength of positive feelings a contributor had towards the pitch (e.g., 1-5). Other techniques for receiving feedback from the contributors are also possible.

At 608, the number of instances of positive feedback and number of views of the pitch are tallied. For example, the tallying may consist of counting the number of contributors that selected the positive feedback button and a total number of contributors that reviewed the pitch.

At 610, the number of instances of positive feedback and the total number of views (i.e., instances the pitch was surfaced) are presented to the author of the pitch. These numbers may be presented simply as numerals, ratio or percentage in an email message or a text message. Numbers may also be presented in a graph such as a bar chart on a web-based user interface.

At 612, process 600 branches depending whether or not the author chooses to develop the work proposed in the pitch. For example, after receiving a relatively large amount of positive feedback the author may choose to develop the pitch. Alternatively, if most of the people that viewed the pitch did not provide positive feedback, the author may choose to abandon that idea. Of course, the author may also disregard the feedback and proceed with or abandon the work based on his or her own preference. If the author decides to abandon the pitch, process 600 proceeds to 614.

At 614, the pitch is made inactive so that it no longer surfaces to contributors. Pitches may also become inactive based on the passage of time. For example, 30 days after the initial posting pitches may be inactivated. In other implementations, pitches may be inactivated automatically if there is only a small amount of positive feedback (e.g., fewer than 20% of those that view the pitch provide positive feedback). Pitches that are inactive may remain saved so that the author can re-activate a pitch. Alternatively, inactive pitches may be deleted.

At 616, a work based on the pitch is received from the author and the author provides instructions to post the work (or whatever portion of the work the author has completed) for access by readers. In some implementations, the work may be made available to readers and contributors through the reader-facing user interface 400 shown in FIG. 4.

At 618, those contributors that provided positive feedback for the pitch are notified that the work or a portion of the work is now available. This notification may be the form of a message sent to accounts of the respective contributors. This notification alerts the contributors to the fact the work was received at 616. Presumably, contributors who provided positive feedback for the pitch will be interested in seeing the pitch developed and reading a work based on the pitch.

Figure 7:
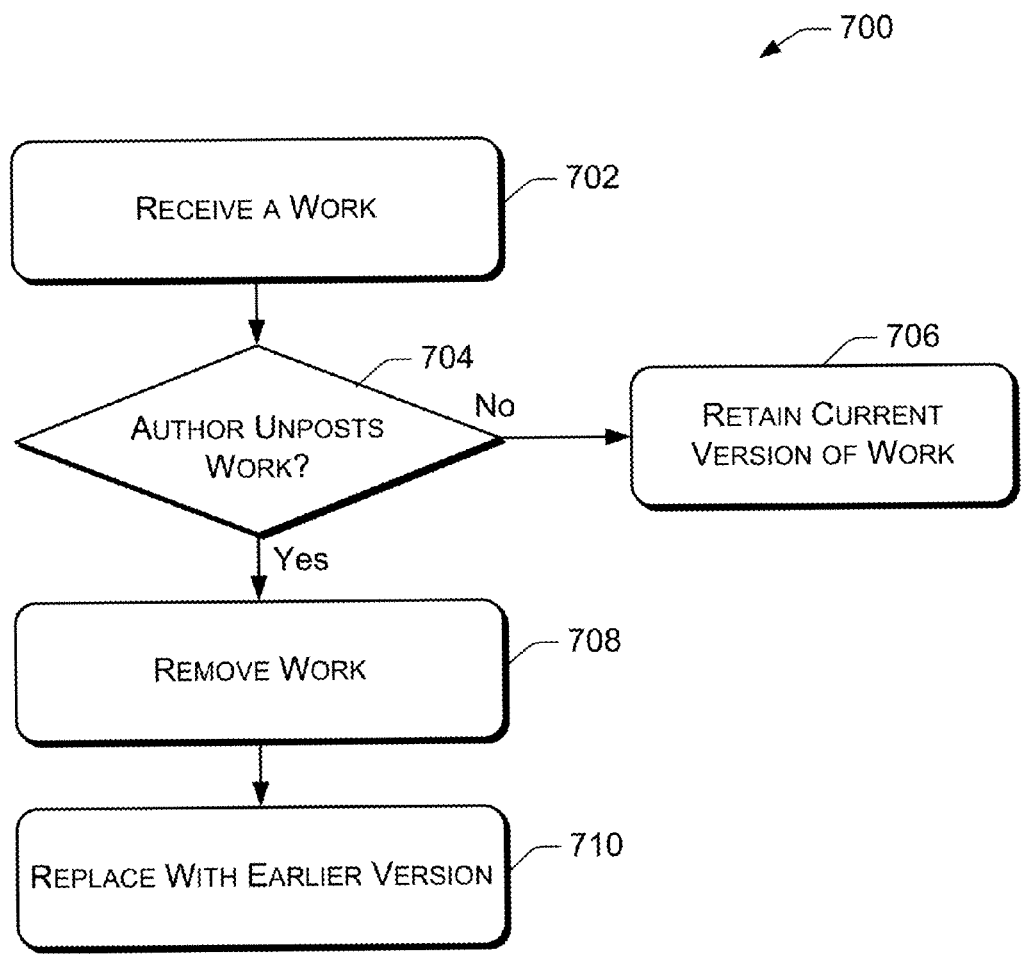
FIG. 7 shows an example process for removing and replacing a work.

FIG. 7 illustrates a process 700 for removing a posting of a work. At 702, a work or portion of a work is received.

At 704, process 700 branches depending on whether the author chooses to unpost all or part of the work. For example, after posting a work the author may receive comments on the work and choose to rewrite or revise all or part of the work. If the author chooses not to unpost the work then process 700 follows the "no" path to 706 where the current version of the work is retained for access by readers and contributors.

At 708, if the author sends instructions to unpost the work, the work may be removed from the collection of works accessible by the readers. After this point if readers attempt to access the work they may simply receive a notification that the work is no longer available.

At 710, the removed work may be replaced with an earlier version of the work. For example, if the writer decides to scrap recent edits and changes to a chapter of a book, the author may remove the current version and elect to return to a previous version of that portion of the work. Alternatively, an earlier version of the work may automatically replace whatever portion of the work the author chooses to remove.

Figure 8A:
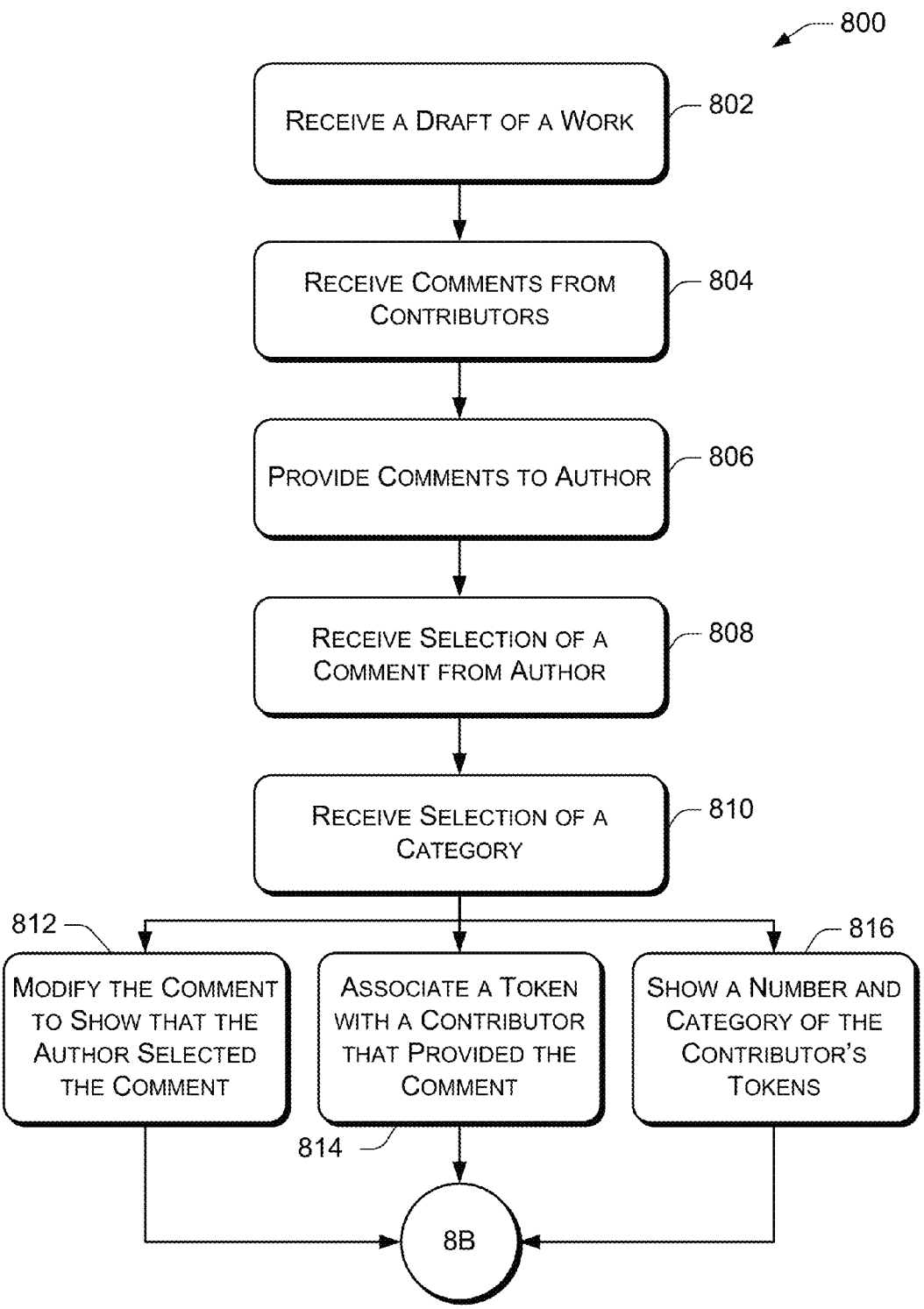
FIGS. 8A and 8B show an example process for providing comments to an author and receiving feedback from the author on the comments.
Figure 8B:
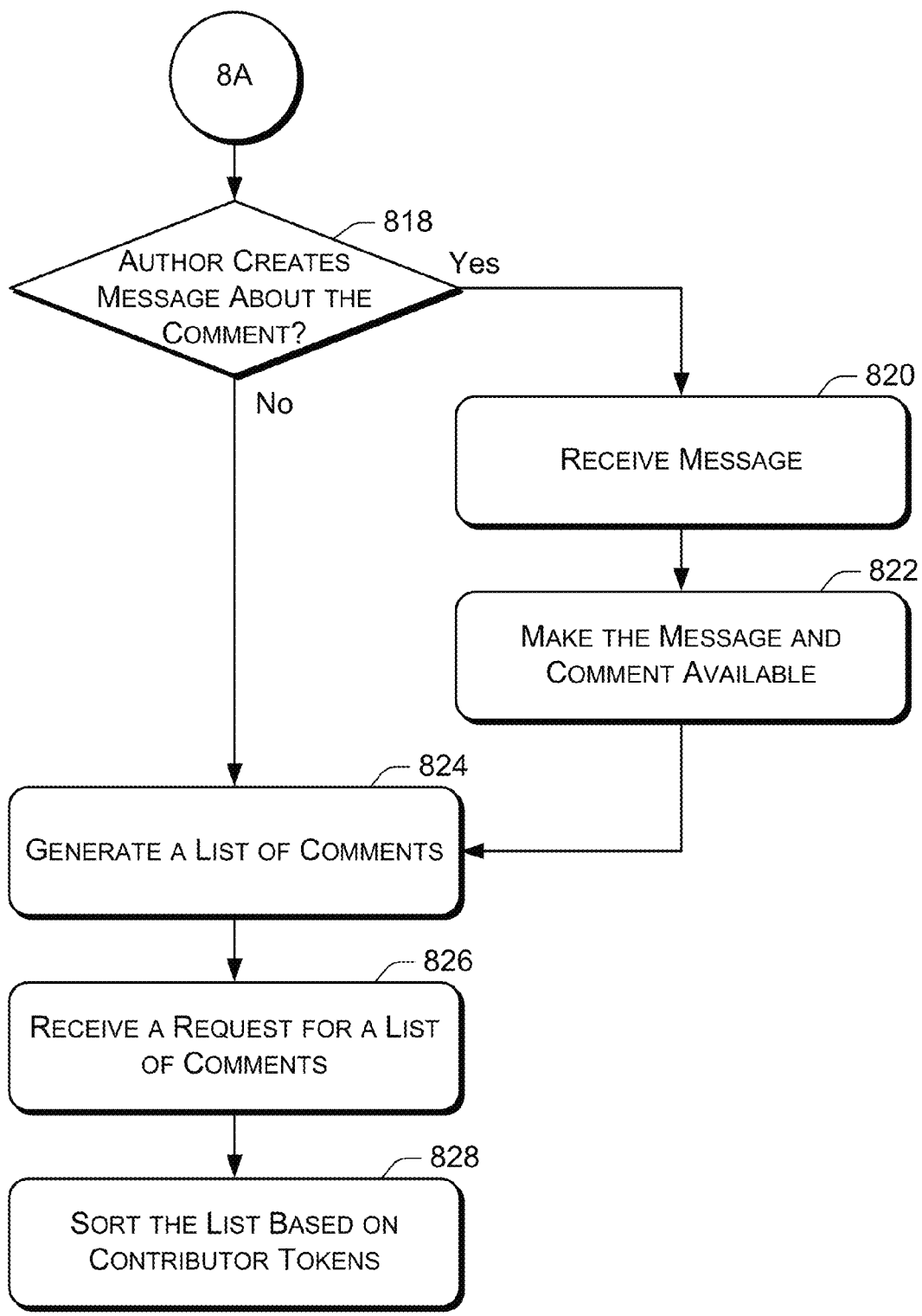

FIGS. 8A and 8B illustrate a process 800 for receiving comments on the work and enabling the author of the work to respond to comments. At 802, a draft of a work is received from an author. The draft of the work may be presented to other users, such as contributors, in a web-based user interface that allows the users to both read the draft and comment on it.

At 804, one or more comments on the draft of the work are received from one or more contributors. The comments may be expressions of opinions about the quality of the work, specific suggestions for how to improve the work, rewritten portions of the work, explanations of factual matter that is relevant to the content of the work, audiovisual files inspired by or intended to accompany the work and the like.

At 806, the comments are made available to the author. For example, the comments may be provided to the author in an author-facing user interface such as the user interface 300 shown in FIG. 3.

At 808, a selection of a comment from the one or more comments is received from the author. Selection of the comment by the author may indicate that the author considers the comment helpful. For example, a comment suggesting how to modify the back story of the main character may be more helpful to the author then a comment stating that the author's story is a good story.

At 810, a selection of a category for the comment is received from the author. The author selects the category from a set of predetermined categories corresponding to types of contributions. For example, the comments may be grouped into different types of contributions such as comments related to artwork, comments for editing, translation (e.g., a contributor voluntarily translating the work from one language into another), content recommendation (e.g., suggestions of how to change the content of the work that are more substantive than mere copy edits or grammatical corrections) or subject matter expertise. This list of possible types of contributions is not exhaustive but merely illustrative. Following the author's selection of a comment at 808 and selection of a type of contribution at 810, the helpful comments will be both labeled as helpful and labeled with a category showing how the comment was helpful.

Following the author's selection and categorization the comment, process 800 may follow any one of a number of paths either in parallel or in series.

At 812, a user-interface for presentation of the comment may be modified to show other users that the author selected the comment at 808. Even though the author and the contributor may know that the comment was selected by the author, in order to provide additional encouragement to contributors and additional status in the community, comments that authors find helpful may be displayed differently than other comments. For example, the user-interface representation may be changed to increase prominence of the comment by, for example, putting the text of the selected comments in bold, making the comments appear larger, rendering the comments a different color, etc. This change in user-interface representation may be shown in the reader-facing user interface 400 of FIG. 4.

At 814, a token may be associated with an account of the contributor who provided the helpful comment. The token may also specify the category selected by the author at 810. As discussed above, tokens represent acknowledgment that the contributor provided a comment which was found helpful or valuable by the author. The contributors may accumulate tokens by providing comments that are later selected by an author as being helpful or valuable. The tokens may be associated with the account of the contributors so that the tokens do not go away even if a comment that earned the contributor a token is deleted when a work is itself deleted.

At 816, a number in category of tokens held by the contributor may be shown to other users. Tokens may be represented in this community as a badge or symbol associated with an account of the contributor. For example, if a contributor is recognized by the author for providing editing comments, a symbol associated with editing may be displayed next to the user name of the contributor. In some implementations, the contributor may receive an additional symbol or badge for each threshold number of tokens received. For example, one "editing" badge for 10 tokens in the editing category, two badges for 20, etc.

Once comments have been received, selected and categorized by the author, the author may choose to respond to one or more of the comments. Thus, process 800 proceeds to FIG. 8B where at 818, the author may determine whether or not to create a message about a comment.

At 820, the message is received from the author about the comment. The author may have decided to create a message about a comment in order to thank the contributor who provided the comment or to request for further information from the contributor. Thus, this communication from the author to the contributor may be thought of a comment on a comment.

At 822, the message and the comment are made available to users. The message may be available only to the contributor who generated the comment or the message may be publicly available to all users who view the comment. In some implementations, the messages may be associated with the comment (i.e., indicating that a particular message is direct to a particular comment) though the use of metadata or other technique.

Whether the author does or does not decide to create a message about the comment, process 800 may proceed ultimately to 824 where a list of comments on the work is generated. The list of comments may include the comment and at least one other comment. In some instances, the list of comments may include many tens of comments.

At 826, a request for an ordered list of comments on the work is received. The request may be received from the author, from a reader, from a contributor or from another user. The request may be generated in response to a selection of a command in a user interface to sort a list of comments.

At 828, the list of comments is sorted by a number of tokens held by contributors that provided the respective comments. For example, a contributor who has a smaller number of tokens may have his or her comment appear lower in the list. A contributor who has a larger number of tokens may have his or her comments appear higher in the list. This would allow a user who is reviewing the comments to first see the comments from those contributors which have received the most recognition from authors. In addition to ordering the list based on the number of tokens, the list may also be ordered based on the type of tokens. For example, if an author is looking for cover art to use with a novel, the author may choose to order a list of comments based on a number of tokens received for the category of artwork. Of course a contributor with many tokens in the artwork category may provide comments on editing or anything else, but this type of ordering could surface those comments that are most likely to contain high-quality suggestions about artwork for the novel.

Figure 9:
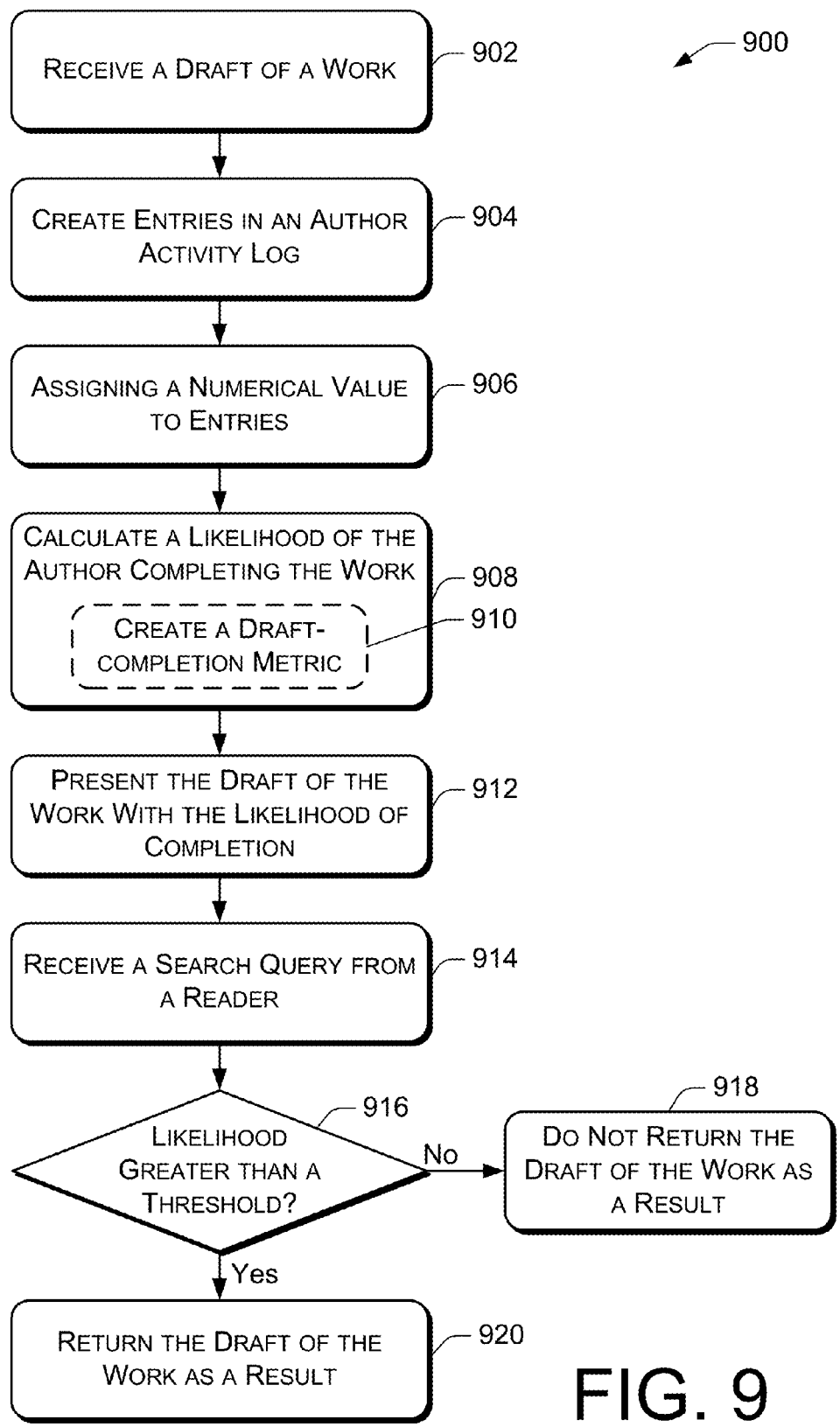
FIG. 9 shows an example process for calculating a likelihood that an author will complete a work.

FIG. 9 illustrates a process 900 for predicting a likelihood that an author will complete a work. One concern of readers and contributors in this community may be investing time in reading and contributing to a work only to have the author abandon the work without finishing it.

At 902, a draft of a work is received from an author for sharing with a plurality of readers. This may represent the initial posting of a rough draft of an entire work, a first chapter of the work, or any other portion or draft of a work.

At 904, entries are created in an author activity log in response to activities performed by the author in association with the draft of the work. For example, the activities may include editing the existing portions of the work, adding a new portion to the work, viewing a comment about the work, responding to a comment about the work, flagging a comment about the work, generating a status message etc. The activities provide a way to observe the author's continued involvement with the work. Some activities may be given more weight as being more indicative of the author following through and ultimately finishing the work. For example, adding a new portion to the work may receive a relatively higher weight than merely viewing a comment. Activities may also be entered in the activity log with timestamps. Thus, the temporal spacing of the activities also be used to infer how likely the author is to finish the work. Steady interactions, as compared to interactions becoming more and more infrequent, may suggest a higher likelihood of an author finishing a work.

At 906, numerical values are assigned to individual ones of the entries in the author activity log. Activities given more weight may have different numerical values assigned due to the weight given to those activities. In some implementations, an activity that takes the author more time to complete (e.g., writing a chapter of a work) may be weighted more than an activity that takes less time to complete (e.g., posting a status update).

For example, a chapter of a work that the author spent three days writing and that contains 5000 words may be given a numerical value of 14. Both the length of time from start to finish and the number of words may be considered when calculating the numerical value. Additionally, completing a chapter may be given a weight of 10. Therefore, the weighted numerical value of completing this chapter of the work may be 10×14 or 140. In comparison, posting a status update that has 25 words may be assigned a numerical value of 5 and the weighting factor for status updates may be one. Thus, the weighted numerical value of the status update is 5.

At 908, a likelihood of the author completing the work is calculated based on a formula that uses the numerical value of individual ones of the entries in the author activity log as inputs. The formula may also take the temporal spacing of the activities as inputs. Both frequency and regularity of activities may affect the likelihood. For example, an author that only engages with his or her work on the weekends, but does so every weekend, may be determined by the formula to have a relatively higher likelihood of completion due to the regularity. Also, an author that has some activity every day, even just reading comments, may receive a higher likelihood of completion due to the short duration of time between activities. The likelihood may be calculated by the prediction module 220. The calculation may be a sum, average, media, mean or other formula that considers the numerical values of the entries in the author activity log. The likelihood may be proportional to an output from the formula. For example, a higher raw output from the formula may correlate with a higher percentage likelihood of completion. Alternatively, the formula is not limited to positive numerical values being "better" but, depending on specific configurations, a more negative value, a value closer to 0, 100 etc. may be "better" in that such value correlates with a higher percentage likelihood of completion.

At 910, a draft-completion metric may be created for the author. The draft-completion metric looks at the author's completion of previous works whereas the entries in the author activity log track activity related to this particular work. The draft-completion metric may be based on a number of previous drafts of works of the author that became final drafts and a number that did not become final drafts. During the writing and revising process, there may be a point where the author can explicitly indicate that a draft is finished and the current work is the final version. Presumably, authors that have a better track record of finishing what they start are more likely to finish a current work in progress. Thus, the draft-completion metric may also be taken as an input to the formula to calculate the likelihood of the author completing the work.

At 912, the likelihood of the author completing the work is presented in a user interface together with the draft of the work. For example, the reader-facing user interface 400 shows a draft completion metric 424 together with the work 402.

Once the community contains multiple drafts of work each that have their own respective likelihoods of being completed, readers searching for content to read in the community may choose to use the likelihood a work will be completed as a way to select works to read.

Thus, at 914, a search query may be received from a reader for a work to read.

At 916, it is determined if the likelihood of the author completing a work is greater than a threshold likelihood. This may be completed for multiple works that match the search query from 914. The threshold may be set automatically or specified by the reader when generating the search query. For example, the threshold may be set at an 85% likelihood of the author completing the work.

For works which the likelihood is less than the threshold, process 900 proceeds along the "no" path to 918 and those works are not returned in the list of results to the search query.

Further works which the likelihood is greater than a threshold, process 900 proceeds along the "yes" path to 920 and drafts of those works are returned as a result of the search query.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processing units;
   computer-readable memory;
   instructions stored in the computer-readable memory to implement an asset service, executable on the one or more processing units, to:
     receive content via an author-facing user interface;
     store metadata about the content, the content comprising one or more of a work, a portion of a work, or a pitch, the metadata including:
       draft metadata designating the content as private, the system sharing content designated as private with the author-facing user interface associated with an author that generated or provided the content, the system refraining from sharing the content designated as private with reader-facing user interfaces associated with users that did not generate or provide the content; and
       shared metadata designating the content as public, the system sharing content designated as public with the reader-facing user interfaces associated with the users other than the author that generated or provided the content; and
     receive an alternate version of the content, the alternate version of the content including a change to the content;
     receive data from an author device including a poll asking for indication of a preference between the content and the alternate version of the content;
   instructions stored in the computer-readable memory to implement a comment module, executable on the one or more processing units, to receive answers to the poll;
   instructions stored in the computer-readable memory to implement an activity service, executable on the one or more processing units, to recognize a call to the system from a computing device displaying the reader-facing user interface and create a record of an event that occurs as a result of the call, the event comprising an interaction on the reader-facing user interface between a reader and the content;
   instructions stored in the computer-readable memory to implement a notification service, executable on the one or more processing units, to receive a notification of the event from the activity service and communicate the event to at least one other portion of the system;
   instructions stored in the computer-readable memory to implement a comment module, executable on the one or more processing units, to receive a comment corresponding to the content and store the comment in association with the content; and
   wherein the event that occurs as a result of the call is creating an association between the comment and the content, and the notification service is further to generate a notification that the comment has been posted in association with the content.

2. The system of claim 1, wherein the asset service is further to associate at least one of draft metadata or shared metadata with the content based at least in part on sharing settings associated with the content.

3. The system of claim 1, wherein the notification service is further to send, by at least one of a feed service or email, notifications to devices associated with at least some users registered to receive corresponding notifications.

4. The system of claim 1, further comprising instructions stored in the computer-readable memory to implement a profile service, executable on the one or more processing units, to store a profile associated with the author and associate metadata indicating that the content is authored by the author.

5. A system comprising:
   one or more processing units;
   computer-readable memory;
   instructions stored in the computer-readable memory to implement an asset service, executable on the one or more processing units, to:
     receive a work by an author;
     receive an alternate version of the work, the alternate version of the work including a change to the work; and
     receive data from an author device including a poll asking for indication of a preference between the work and the alternate version of the work;
   instructions stored in the computer-readable memory to implement a comment module, executable on the one or more processing units, to receive answers to the poll;
   instructions stored in the computer-readable memory to implement an activity service, executable on the one or more processing units, to create an event based on the asset service receiving the work and to store a record of the event in an author activity log, the event comprising at least an identification of the author, an identification of the work, and a type of the event; and
   instructions stored in the computer-readable memory to implement a notification service, executable on the one or more processing units, to create a notification about the event and send the notification to a device associated with a user who has previously selected to receive notifications for activities associated with one or more of the author or with the work.

6. The system of claim 5, wherein the type of event comprises one or more of posting a portion of a work or posting an entire work.

7. The system of claim 5, wherein the notification service is further to send the notification of the event to users via one or more of an activity feed or email.

8. The system of claim 5, further comprising instructions stored in the computer-readable memory to implement a user interface module, executable on the one or more processing units, to facilitate communication of information between the system and one or more user interfaces; and
   wherein the activity service is further to receive a communication from the user-interface module and pass an event representing the communication to the notification service.

9. The system of claim 5, further comprising instructions stored in the computer-readable memory to implement a comment module, executable on the one or more processing units, to receive a comment about the work from a contributor, send metadata about the work to the asset service and associate the comment with the work using the metadata.

10. The system of claim 5, wherein the notification service is further to send a comment notification to a device associated with the author in response to the activity service storing, in a reader activity log, a record of a comment being received for the work.

11. The system of claim 5, wherein the asset services is further to:

make the work available to a first group of devices associated with a first group of users selected by the author; and after a pre-determined period of time has passed, make the work available to a second group of devices associated with a second group of users that includes the first group of devices associated with the first group of users.

12. The system of claim 11, wherein the first group of devices associated with the first group of users comprises a device associated with a contributor that has provided a comment on the work.

13. The system of claim 5, further comprising instructions stored in the computer-readable memory to implement a real-time messaging service, executable on the one or more processing units, to pass messages between a first device associated with the author and a second device associated with a contributor that has provided feedback on the work.

14. The system of claim 5, further comprising instructions stored in the computer-readable memory to implement a preference service, executable on the one or more processing units, to store identification of one or more of other authors or other works for which a device associated with the author has generated an indication of interest in receiving notifications.

15. The system of claim 5, wherein the alternate version of the work comprises a first ending of the work, different than a second ending of the work.

\* \* \* \* \*